(12) United States Patent
Teichert

(10) Patent No.: US 7,521,083 B2
(45) Date of Patent: Apr. 21, 2009

(54) METHOD AND APPARATUS FOR TREATMENT OF A ROTOR BLADE ON A WINDMILL

(75) Inventor: Paul Teichert, Esbjerg (DK)

(73) Assignee: PP Energy APS (DK)

( * ) Notice: Subject to any disclaimer, the term of this patent is extended or adjusted under 35 U.S.C. 154(b) by 964 days.

(21) Appl. No.: 10/497,579

(22) PCT Filed: Dec. 4, 2002

(86) PCT No.: PCT/DK02/00823

§ 371 (c)(1),
(2), (4) Date: Sep. 17, 2004

(87) PCT Pub. No.: WO03/048569

PCT Pub. Date: Jun. 12, 2003

(65) Prior Publication Data

US 2005/0042102 A1    Feb. 24, 2005

(30) Foreign Application Priority Data

Dec. 6, 2001  (DK) ............................... 2001 01817
Jan. 4, 2002  (DK) ............................... 2002 00014

(51) Int. Cl.
*B32B 43/00* (2006.01)

(52) U.S. Cl. .................. 427/140; 427/142; 134/22.11; 134/12; 134/22; 134/43; 134/44; 134/47; 134/52

(58) Field of Classification Search ................. 427/140; 134/22.11
See application file for complete search history.

(56) References Cited

U.S. PATENT DOCUMENTS 5,679,174 A * 10/1997 Buongiorno ............. 134/22.18

FOREIGN PATENT DOCUMENTS

| DE | 3226629 | * 12/1983 |
| DE | 296 03 278 | 6/1996 |
| DE | 19909698 | * 4/2000 |

OTHER PUBLICATIONS

International Search Report; PCT/DK02/00823; Feb. 20, 2003.

* cited by examiner

*Primary Examiner*—Duy-Vu Deo
*Assistant Examiner*—Maki Angadi
(74) *Attorney, Agent, or Firm*—Cantor Colburn LLP

(57) ABSTRACT

Method and apparatus for treatment of a surface of a rotor blade of a windmill, the apparatus being placed in such a manner to be moveable in relation to the surface of a rotor blade, and the apparatus being caused to move depending on a form of treatment determined by means for treatment mounted on, in or next to the apparatus. In this manner, various forms of treatment of a rotor blade may be carried out such as for instance washing, finishing, sealing, etc.

21 Claims, 10 Drawing Sheets

METHOD AND APPARATUS FOR TREATMENT OF A ROTOR BLADE ON A WINDMILL

FIELD OF THE INVENTION

The present invention relates to a method and an apparatus for treatment, including washing, sealing, painting, drying and/or examination, of a rotor blade on a windmill.

BACKGROUND OF THE INVENTION

Within the field of windmills, it is commonly known that in order for a windmill to generate an optimal yield, the aerodynamic conditions of the windmill, including especially the aerodynamic conditions of the rotor blade, must be met. Thus, the manufacturers of windmills place great effort into making the rotor blades as efficient as possible in order to generate a good operating ratio. This does not only include the shape of the rotor blades, but also the surface character of the rotor blade, as it is an object to manufacture a surface which is as smooth as possible.

However, it is also realized that after a somewhat brief period of operation, e.g. six months, the rotor blades of a windmill may be so dirty from dust, salt coatings, dead insects, bird droppings and other surface coatings, that the efficiency of a given windmill may be reduced by 10 to 15% depending on the relevant wind speed.

Thus, it has been realized that it is desirable to carry out a cleaning and subsequent sealing of the windmill wings on a regular basis, depending on the relevant location of the windmill.

So far, such cleanings have been carried out manually by bringing the windmill to a stop and locking it into positions in which the rotor blades point towards the ground. Subsequently, each rotor blade has been rinsed individually and manually by using various arrangements to provide the manpower with the necessary work position and height.

Such a hoisting arrangement is known from German utility model DE 296 03 278 U in which suspension means are fastened to each of the two rotor blades near the hub of the rotor once the windmill has been brought to a stop and with one rotor blade pointing straight downwards. A special work platform with a through-going slit at the bottom has been fixed to these suspension means so that the rotor blade pointing downwards could be inserted into this slit. The work platform has subsequently been hoisted upwards in a stepwise manner, while the crew has rinsed the surface of the rotor blade manually, e.g. with one person located on each side of the rotor blade.

Even with such an arrangement, it is a time-consuming process to carry out a cleaning of the rotor blades of a windmill, just as such a known arrangement would probably require the use of machinery, such as a crane, for fixation of the suspension means. Thus, it could be claimed that two individuals, when mid-sized windmills are involved, would probably not be able to clean more than 4 windmills per day.

BRIEF DESCRIPTION OF THE INVENTION

The invention generally presents a method and an apparatus, whereby a higher degree of automation in the cleaning, sealing and examining process of windmill rotor blades may be obtained.

Also, the invention presents such a method and such an apparatus that a significant rationalization and a reduction of costs of the cleaning may be obtained.

Further, the invention presents a method and an apparatus, whereby an increased efficiency gain may be obtained as the object is also to improve and create a more uniform result of the cleaning and sealing.

In addition, the invention obtains a method and an apparatus capable of subsequent surface treatment, e.g. with a preventive effect against soiling, such as wax treatment etc.

Thus, also the invention presents a method and an apparatus, whereby the useful life of the rotor blades may be increased, and whereby the efficiency—and thus the financial gain from a windmill—may be improved.

Further, the invention presents a method and an apparatus whereby it is possible to avoid having persons carry out a relatively demanding job at risky work heights and under conditions which are not optimal.

Also, invention presents a method and an apparatus, whereby the treatment of rotor blades, including especially washing and sealing, may be carried out with environmentally friendly means and with minimal consumption of water, cleaning articles and sealing agents.

Also, invention presents a method and an apparatus, whereby additional work operations may be carried out simultaneously with or instead of cleaning work etc.

Additionally, the invention presents a method and an apparatus, whereby other treatments may be carried out with only minimal use of manual work such as surface treatments, e.g. painting of the rotor blades of a windturbine, inspection of the rotor blade, measurements of the rotor blade etc.

These and other advantages are obtained by the invention as will be explained in detail in the following.

According to the invention, a method of treatment of a surface of a windmill rotor blade is characterized by
  placing an apparatus in such a manner that it is moveable in relation to the surface of a rotor blade, and by
  bringing the apparatus into movement depending on a form of treatment determined by means for treatment mounted on, in or next to the apparatus.

In this manner, treatment of the rotor blade may be carried out without having to arrange for hoisting devices, scaffolding or the like necessary for manual treatment. Further, it is possible to avoid exposing persons carrying out such treatment, e.g. washing and sealing of the rotor blades, to the relevant unfavourable conditions which means that an improvement in the working environment may be obtained. Further, a high degree of automation of such treatment processes may be obtained, just as such treatments may be carried out quicker and more efficiently. Naturally, this may also result in an increase in the efficiency of a windmill, on which such treatment has been carried out, just as an increase in the useful life of the windmill may be obtained, depending on the nature of treatment, thereby making it a financial gain to the owner and to society.

It should be noted that treatment includes an extensive list of operations or actions carried out in connection with a rotor blade. Thus, it includes washing, other cleaning, drying, e.g. by air, heated air, radiation etc., painting, pre-treatment, finishing, sealing of the surface etc. Furthermore, it includes inspection of the surface, examination of the surface or of the rotor blade as such, e.g. by means of known examination methods such as radiation examinations etc.

Thus, it is a given that the form of treatment is determined by the means for treatment mounted on, in or next to the apparatus for that specific purpose, which will be decisive for the way the apparatus moves in relation to the rotor blade.

It is obvious that the type and nature of such means, which may naturally comprise several parts, mounted in, on or next to the apparatus, or simply one part mounted as a single unit, may vary depending on the desired purpose of the treatment, the construction and characteristics of the rotor blade, the surroundings etc., which will be apparent to a person skilled in the art.

Preferably, as specified in claim 2, the apparatus is moved essentially in a direction of the longitudinal axis of the rotor blade, said apparatus performing a treatment of the rotor blade during at least part of this movement and/or standstill, preferably of the surface.

In this manner, a treatment is obtained which may be carried out continuously while the apparatus is moved up and down the rotor blade, or it is possible to carry out treatment in steps so that the apparatus is moved stepwise. Combinations of these forms of treatment are naturally also possible. The method may thus be carried out by means of an apparatus whose design is limited in size, weight and/or complexity.

According to another preferred embodiment, as specified in claim 3, the apparatus is moved by means of one or more means carrying out a pull such as lines, wires or the like, positioned adjacent to the root of the rotor blade, at the top of the windmill tower and/or at the nacelle of the windmill.

In this manner, the method may be applied even from ground level, from a vehicle or from a vessel by the apparatus being pulled up to a rotor blade stopped in a position essentially pointing downwards, and be moved up and down along it. It should be noted that said positioning may be carried out in various ways, e.g. by placing a fastening part on the rotor blade, on one or both of the other rotor blades, on the nacelle or on the tower, or by utilizing existing possibilities for placing said lines or the like near the root of the rotor blade, e.g. at the nacelle or at the top of the tower.

According to yet another preferred embodiment, as specified in claim 4, the apparatus is moved by controlling a pull in said means for exercising a pull.

In this manner, a pull in said lines or the like may be obtained by means of e.g. a hoist which may be mounted on a means of transportation, on the ground or on the windmill, or otherwise appropriately located, said lines being connected to the apparatus. These lines may e.g. be led over tackles or the like at said positioning.

According to an alternative embodiment, as specified in claim 5, the apparatus is moved by carrying out a controlled pull in said means exercising a pull.

In this manner, it is possible to apply the method by having the apparatus feature means for moving up and down along said lines or the like. Such means may e.g. be motors with drive wheels, rollers, cylinders or the like, in engagement with the lines.

According to another embodiment, as specified in claim 6, the apparatus is moved by applying force to the rotor blade at least partly in the direction of a longitudinal axis of the rotor blade. In this manner, said movement may be obtained wholly or partially by the apparatus exercising direct action on the rotor blade via e.g. driving wheels integrated in the apparatus.

According to another embodiment, as specified in claim 7, the apparatus may be moved by exercising force between the apparatus and part of the windmill tower, such as a guide rail positioned on the windmill tower. Such a part, which may be designed as a guide, pull and/or friction rail, may potentially form a permanent part of the windmill tower so that the method according to the invention may be applied without any special preparation.

Preferably, as specified in claim 8, said surface treatment may comprise one or more of the following, namely:

cleaning such as washing, potentially with pressurized water and potentially by utilizing special cleaning articles, brushes and/or sealing agents, other cleaning, potentially by utilizing mechanical means, painting, such as applying paint, lacquer and/or similar means, pre-treatment, incl. cleaning, degreasing, sanding etc., after-treatment, such as e.g. drying, potentially by utilizing air and potentially heated air, heating such as radiation e.g. created electrically, polishing etc., sealing of the surface, potentially by wax or other corresponding means, surface treatment comprising treatment of the surface with the aim of repelling dirt and/or maintenance such as applying wax, sealing agents and/or similar means, inspection and/or testing of surface or parts hereof, inspection and/or testing of the rotor blade as such, incl. the underlying parts hereof, measurements carried out on or in connection with the rotor blade or the windmill, and other treatment of the surface of the rotor blade, incl. preventive treatment, repairs or the like.

In this manner, a preferred method is obtained by means of which said treatments may be carried out. Especially in connection with cleaning, it should be mentioned that the surface of the rotor blade may be rinsed for the above-mentioned dirt covers compiled over time, which may be a short or long period of time depending on the location of the windmill.

Furthermore, it should be noted that said surface treatment may consist of applying paint, lacquer or the like, which may e.g. be advantageous, if/when the surface of a rotor blade has been seriously scratched, worn down or otherwise had its surface coat damaged, e.g. after (rough) cleaning of the surface for dirt etc.

By this advantageous embodiment, another effect is obtained since such subsequent surface treatment may have several advantages. Firstly, re-soiling of the surface will not take place as quickly as on a non-treated surface, secondly the useful life of the surface, and thereby the rotor blade, may be increased for example if the surface treatment comprises means for protection against deterioration, e.g. due to sunlight, UV-radiation in general etc., and thirdly, the aerodynamic conditions of the rotor blade are improved so that an increase in the efficiency, and consequently an increase in energy production of the windmill, is obtained.

Furthermore, painting may prolong the remaining useful life of a windmill wing, just as an improvement in efficiency may be obtained.

The invention also relates to an apparatus for treatment of a surface of a rotor blade on a windmill, said apparatus according to the invention comprising means for transfer of movement in relation to the rotor blade and in such a manner that said apparatus is displaceable in relation to the rotor blade, and said apparatus comprising means for treatment of the surface of the rotor blade.

In this manner, the apparatus may carry out a treatment of the rotor blade without having to arrange for hoisting arrangements, scaffolds or the like, necessary in connection with manual treatment. Further, it is avoided that persons need to carry out such a treatment, such as washing and sealing of the rotor blades, at the relevant unfavourable conditions which means that an improvement in the working environment may be obtained. Further, the apparatus offers the possibility of a high degree of automation of such treatment processes, just as the treatments may be carried out quicker and more efficiently. Naturally, this may also result in an increase in the operating ratio of a windmill, on which such treatment by such an apparatus has been carried out, just as an increase in the useful life of the windmill may be obtained, depending on the nature of treatment, thereby making it a financial gain to the owner and to society.

It is obvious that the type and nature of such means for treatment, which may naturally comprise more parts, mounted in, on or next to the apparatus, or simply one part mounted as a single unit, may vary depending on the desired purpose of the treatment, the construction and characteristics of the rotor blade, the surroundings etc., which will be apparent to a person skilled in the art.

Preferably, as specified in claim 10, said means for transmission of movement in relation to the rotor blade may comprise one or more means for exercising a pull such as lines, wires or the like, positioned near the root of the rotor blade, at the top of the windmill tower and/or a the nacelle of the windmill.

In this manner, the apparatus may be pulled up even from ground level, from a vehicle or from a vessel, to a rotor blade stopped in a position essentially pointing downwards, and be moved up and down along it. It should be noted that said positioning may be carried out in various ways, e.g. by placing a fastening part on the rotor blade, on one or both of the other rotor blades, on the nacelle or on the tower, or by utilizing already existing possibilities for placing said lines or the like near the root of the rotor blade, e.g. at the nacelle or at the top of the tower.

In yet another advantageous embodiment, as specified in claim 11, said means for exercising a pull may be connected to the apparatus and may extend in the direction towards the positioning at which the pull direction is changed.

In this manner, the apparatus may be moved by exercising a pull in said lines or the like by means of e.g. a hoist mounted on a means of transportation, on the ground on or near the windmill or otherwise appropriately located, and said lines being connected to the apparatus. These lines may e.g. lead over a tackle or the like at the position at which the pull direction is changed.

In yet another preferred embodiment, as specified in claim 12, said means exercising a pull may be connected to said positioning, and said apparatus may comprise means for exercising a pull in this or these means. In this manner, the means of the apparatus for moving up and down along said lines or the like may pull the apparatus up and down the rotor blade, e.g. by running up and down these lines or the like. Such pulling means may e.g. be motors with drive wheels, rollers, cylinders or the like engaging the lines.

Preferably, as specified in claim 13, said means for transfer of movement in relation to the rotor blade comprises means for flexibly gripping around two surfaces of the rotor blade essentially located across from each other.

The means for flexibly gripping around two surfaces of the rotor blade essentially located across from each other may preferably comprise wheels or similar known means, which may be pressed against the surface by means of e.g. hydraulically, pneumatically or electrically driven means. The two surfaces of the rotor blade located across from each other may e.g. be the leading and trailing edges of the rotor blade but it may naturally also be other surfaces, just as more than two surfaces may be involved. Thus, means for flexibly pressing against the rotor blade may be located in all appropriate places, especially in close proximity to the front and back edges, so that a sufficient degree of fixation of the apparatus to the rotor blade may be obtained and so that the apparatus is capable of moving in the essentially longitudinal direction of the rotor blade.

Preferably, as specified in claim 14, said means for transfer of movement in relation to the rotor blade comprises drive means for moving the apparatus in said direction of the longitudinal axis, said drive means being incorporated in the apparatus.

In this manner, said means may serve two purposes, since they partly fix the apparatus onto the rotor blade, and partly carry out a drive up and down the rotor blade, preferably in an automated manner, but in certain situations and according to certain embodiments also in a semi-automated or manually controlled manner. It is advantageous to have electric motors carry out the drive, whereby an appropriate and fairly simple and easy construction may be created, since the electric motors may be located in immediate proximity of the wheels, and potentially even be integrated with the wheels, as is known from other technical areas. However, the drive means may also be of other types such as the hydraulic type, the pneumatic type or the like, as will be apparent to a person skilled in the art.

According to yet another preferred embodiment, as specified in claim 15, said means for transfer of movement in relation to the rotor blade may comprise drive means and/or control means arranged on or at the windmill tower, e.g. in the form of a guide rail positioned on the windmill tower. Such drive means and/or control means, which may be designed as a guide, pull or friction rail, may constitute a permanent part of the windmill tower, so that the apparatus according to the invention may be applied without any preliminary arrangements. The apparatus may thus be designed with a drive motor or the like, which engages directly or indirectly with for instance a guide rail on the windmill tower.

According to the embodiment specified in claim 16, said means for treatment of the surface of a rotor blade is designed to carry out one or more of the following forms of treatment, namely cleaning of the surface, preferably by means of water, potentially pressurized water and/or potentially by utilizing special cleaning articles and/or sealing agents, other cleaning, potentially by utilizing mechanical means, painting, such as application of paint, lacquer and/or similar means, pre-treatment, incl. cleaning, degreasing, sanding etc., after-treatment, such as e.g. drying, potentially by utilizing dry air and potentially heated air, heating such as radiation for instance created electrically, polishing etc., sealing of the surface, potentially by wax or other similar means, surface treatment by applying a preserving means such as wax and/or a sealing agents to the surface, inspection and/or testing of surface or parts hereof, inspection and/or testing of the rotor blade as such, incl. underlying parts hereof, measurements etc. carried out on or in connection with the rotor blade or the windmill, and/or other treatment of the surface or rotor blade, incl. preventive treatment, repairs or the like.

In this manner, a preferred embodiment of the apparatus is obtained, whereby said forms of treatment may be carried out. Especially in connection with the cleaning, it should be mentioned that the surface of the rotor blade may be efficiently rinsed for the above-mentioned dirt compiled over a period of time, which may be a short or long period of time depending on the location of the windmill.

Furthermore, said means for treatment of the surface of the rotor blade may advantageously be designed to apply a preserving means such as wax and/or other sealing agents, just as it may be designed to apply paint, lacquer and similar means.

With this preferred embodiment, yet another effect is obtained by the apparatus according to the invention, since such subsequent surface treatment may have several advantages. Firstly, re-soiling of the surface will not take place as quickly as on a non-treated surface, secondly the useful life of the surface and thereby the rotor blade may be increased, e.g. if the surface treatment comprises means for protection against deterioration due to e.g. sunlight, UV-radiation in general etc., and thirdly, the aerodynamic conditions of the rotor blade may be improved so that an increase in the operating ratio, and consequently an increase in the energy production of the windmill, is obtained.

In another preferred embodiment, as specified in claim 17, said means for treatment of the surface of the rotor blade may comprise means for mechanical treatment of the surface, for instance brushes or the like, preferably rotating brushes. In this manner, said cleaning etc. may be carried out in an advantageous manner. For example, rotating brushes of the same type as those often used in car wash systems may be used, just as it is possible to apply a control function in relation to for instance the surface, which corresponds to that used in a car wash. Furthermore, it should be mentioned that such brushes may naturally be positioned on both sides of the rotor blade and that these brushes may be positioned above each other in multiple zones. Also, it should be mentioned that one single rotating brush with a length corresponding to the width of the rotor blade may be applied on each side, or more brushes may be applied in the cross direction. Moreover, it should be noted that rotating brushes may be positioned with their longitudinal axes in another direction, e.g. in the same direction or essentially in the same direction as the longitudinal axis of the rotor blade.

In yet another preferred embodiment, as specified in claim 18, said means for treatment of the surface of the rotor blade may comprise means such as e.g. nozzles, for application of liquids, powdered material and/or the like.

In this manner, high-pressure cleaning may be carried out or act as a supplement to the brush cleaning. Furthermore, such nozzles, which may be located in separate zones in the apparatus, may be used for other media than water, e.g. cleaning agents, means for surface treatment, wax treatment etc.

In a particularly preferred embodiment, as specified in claim 19, said apparatus may comprise an encapsulation, which is preferably essentially cylindrical in shape.

With this embodiment, appropriate screening of the apparatus against weather measures is obtained, and a special feature is that liquids, materials and the like from the nozzles etc. may be led over towards the intended areas of the rotor blade in an unhindered manner. Furthermore, a strong, stable and light construction which may serve as the basic part of the apparatus may be obtained.

In yet another preferred embodiment, as specified in claim 20, the apparatus may comprise means for sealing against a rotor blade, preferably at the bottom of said encapsulation. In this manner, it is not only ensured that the wind may not blow through the apparatus, but also that water, cleaning articles etc. may not run down the rotor blade in an unhindered manner, and thus result in pollution of the environment in adverse circumstances. Furthermore, with this embodiment an advantageous lead-down or downwards pumping of these liquids and materials may be established, so that they may be accumulated and removed in a secure manner and maybe be recycled. It should be noted that a similar sealing may be designed at the upper part of the apparatus.

According to the embodiment specified in claim 21, the apparatus may advantageously feature means for inspection of the rotor blade, such a optical inspection by means of vision equipment, and/or equipment carrying out measurements or control of the rotor blade.

In this manner, a manual inspection of the rotor blade may be carried out of its condition and/or of the result of an ongoing or completed treatment. It should be understood that a monitor will be located in or on the vessel or vehicle, e.g. together with control equipment, by means of which the person operating the apparatus according to the invention may monitor the work and inspect the surface. Thus, it will also be possible to interrupt the automatic progress of the apparatus, if there is a spot which has not been properly cleaned or is particularly dirty, and let the apparatus treat such a spot again. Also, the vision equipment, camera etc. also allow for meticulous control of the apparatus, e.g. up to the tip of the rotor blade (or to a level above this), at which the apparatus may initiate its work process, just as it may ease control in other ways.

Finally, as specified in claim 22, the apparatus may feature lighting means.

In this manner, the apparatus according to the invention may be utilized effectively, since it will not be necessary to limit operation to periods of daylight. This is particularly important when taking into account the fact that operation must be carried out during periods with limited wind speeds. Once periods with the right limited wind speeds are present, it will be possible to carry out operation 24 hours a day when the apparatus is provided with lighting means, which will also result in optimal utilization of the equipment, just as it will be cost-saving in connection with e.g. contract work. Furthermore, lighting will be advantageous with respect to e.g. windmills at sea, since it is possible upon arrival at the wind power farm by vessel to continue operation with the equipment in an unhindered manner despite darkness, so that efficient utilization of the equipment and a reduction of the transportation time may be obtained. Correspondingly, the same will apply to wind power parks on land in remote areas.

Moreover, the apparatus may be designed to move independently in relation to the rotor blade, possibly by wireless control and/or monitoring, and the apparatus may be designed with storage means, such as tanks or the like, for the necessary treatment means.

It should be noted that the apparatus according to the invention will preferably be designed in such a manner that it may operate in a highly automated manner once it has been positioned on a rotor blade. Thus the apparatus, when designed for cleaning, washing etc., will have the character of a washing robot and may for example be designed in such a manner that it is possible to enter the desired form of treatment, e.g. the desired washing program, such as washing with subsequent sealing and inspection, just as it will be possible to enter the type of wind mill and/or the size of the rotor blade, after which the apparatus, for instance the washing robot, will automatically carry out the program, possibly by use of cooperating sensors etc. to indicate when the apparatus has reached an end of the rotor blade etc., as will be well-known from other areas using automated control.

Due to the automated characteristics and the method of operation, the washing robot is also referred to as the Aqua Spider.

It will also be obvious that the apparatus should be able to adapt to e.g. varying widths along a rotor blade which is the reason why it will be flexible in design with for instance control of support wheels, rotating brushes etc. which are individually adaptable under the control of control equipment which may, in turn, be hydraulically, pneumatically or electrically driven. In practice, however, there will be limits to such flexibility, since an apparatus will have a minimum and a maximum operating width. Thus, it is advantageous to manufacture apparatuses incrementing in steps so that each type will be able to treat rotor blades belonging to a given size interval.

At the same time, it is possible to carry out treatment of both sides of the rotor blade simultaneously by the method and the apparatus according to the invention, but it is also possible to design the apparatus in such a manner that only one side is treated if desirable.

It should moreover be noted that the apparatus is designed in such a manner that is possesses the necessary strength and rigidity while minimizing the weight. This is done by using the available and appropriate materials at the time in question, which may be used with respect to the requirements of strength, rigidity and weight. Furthermore, the construction with the cylindrical or can-shaped structure will ensure a stable and rigid construction.

Finally, it should be noted that a basic part with chambers for water, treatment means for cleaning and sealing, control equipment, monitor, the necessary components for electrical supply, hydraulic or pneumatic systems etc. may be designed in one single unit, which may e.g. be positioned on a trailer together with the apparatus according to the invention, or which may easily be positioned on e.g. a truck, a barge or another vessel, so that transportation etc. to the wind mills is made easy.

Also, it should be noted that in certain embodiments and by certain applications, the apparatus according to the invention may be utilized by wireless control of the apparatus, and that it may even have its own energy supply, e.g. in the form of a built-in battery, just as the apparatus may be designed with tanks for water, cleaning articles, sealing agents etc., so that the apparatus may constitute a separate unit.

BRIEF DESCRIPTION OF THE FIGURES

The invention will be described in detail in the following with reference to the drawings, in which.

DETAILED DESCRIPTION OF THE INVENTION

Figure 1:
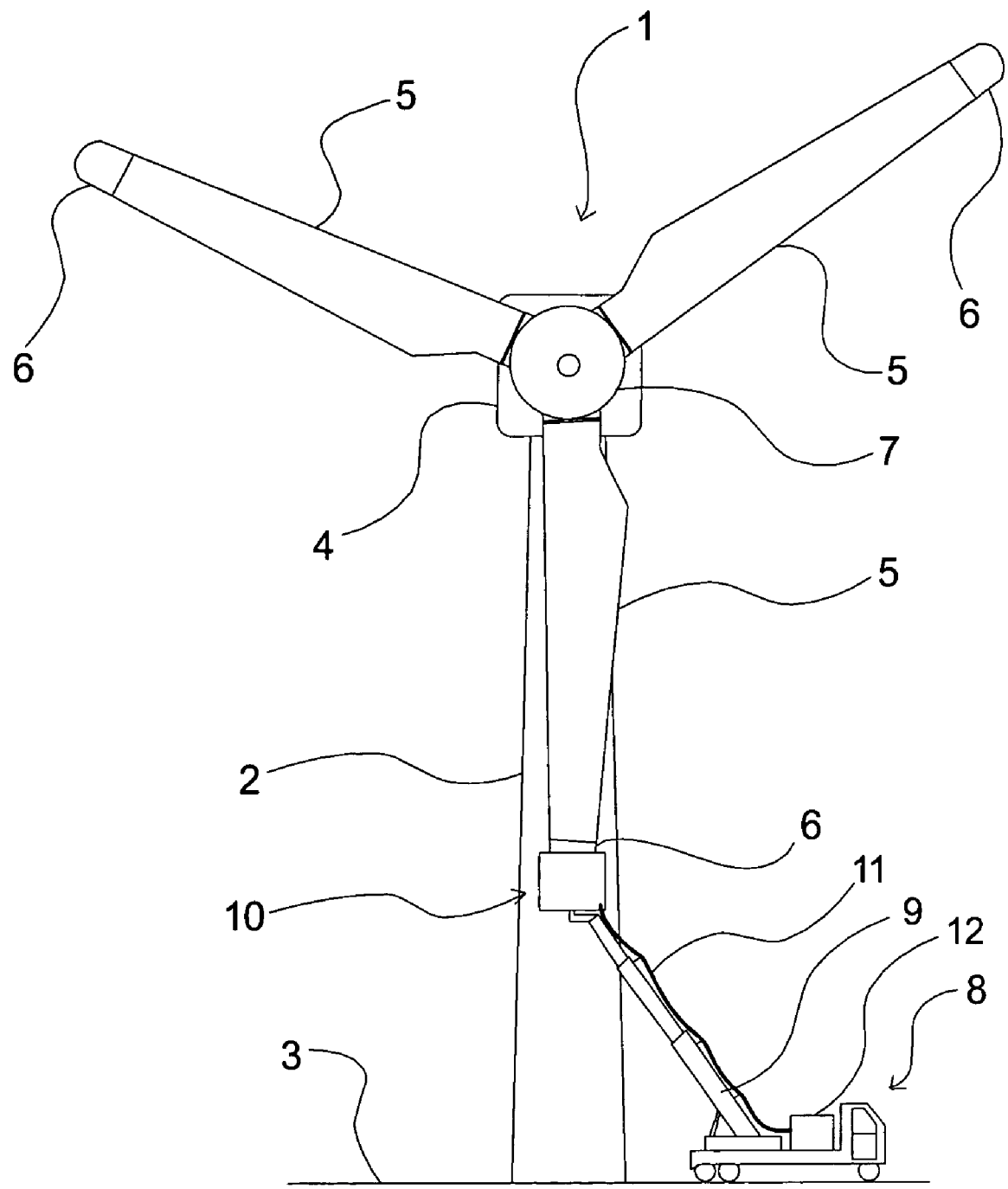
FIG. 1 illustrates utilization of an embodiment of the invention in connection with a land-based wind mill.

FIG. 1 illustrates a commonly known land-based windmill 1 seen from a position directly in front of the rotor blades. Such a commonly known windmill 1 comprises a windmill tower 2 positioned on a foundation on the ground 3. A nacelle 4 has been positioned at the top of the windmill tower 2, and comprises a generator, gear mechanisms, control equipment, beddings etc., which may be turned depending on the direction of the wind as already known. Thus, the nacelle 4 also carries the rotor hub 7, upon which a number, in this case 3—which is most often the case—rotor blades 5, have been placed. These rotor blades 5, often applied in such a manner that they may essentially be turned around a longitudinal axis in correspondence with wind speed etc., may have wing tips 6 as illustrated depending on their type and brand. However, rotor blades without such special wing tips are also known but what the rotor blades usually have in common is that the width of the rotor blade at the tip will be fairly small/limited.

An apparatus according to the invention for treatment, e.g. washing and sealing of the rotor blades 6, is shown in FIG. 1 in a stylistic manner and is marked 10. In the following, this apparatus will also be referred to as a washing robot (Aqua Spider), despite the fact that it is capable of carrying a several additional functions than that of simply carrying out a washing as will be described in the following.

As will also be apparent from the following, the apparatus 10 will be able to move in various ways in relation to the rotor blade 6 and it will also be possible to place it or guide it up to and along the rotor blade 6 in various ways. One of the ways are illustrated in FIG. 1, namely in which a vehicle 8, e.g. a truck, mobile crane or the like, with a mounted crane 9 or a similar hoist or lift arrangement as shown in the figure, is designed to lift the apparatus 10 according to the invention up towards a rotor blade 6 to be rinsed, for example.

As shown, the vehicle may be a truck or a crane vehicle, but the type and size of the vehicle may vary considerably, in particular in relation to the size of the windmill in question, the length of the rotor blades and the height up to which the apparatus according to the invention should be elevated. Thus, a trailer with a mounted hoist arrangement may be used or a unit comprising a hoist arrangement, an apparatus with a washing rotor, tanks and control equipment may be placed on a trailer or another light vehicle.

Since the apparatus according to the invention is designed with focus on low weight as will be explained later, light vehicles may be used to elevate the apparatus according to the invention, even in relation to relatively large windmills. Furthermore, the type of hoist arrangement may vary considerably which will be obvious from the examples presented below.

As indicated, the washing robot or apparatus 10 is connected to wires and/or hoses 11, which lead down to a unit generally marked 12 via the hoist arrangement 9, and which may e.g. comprise a water tank, tank(s) with cleaning agents, surface treatment means, sealing agents etc., as will be explained in detail below. Furthermore, the unit 12 may comprise various arrangements or components such as hydraulic equipment, pneumatic equipment, pumps, control equipment, power supply components and/or the like. As illustrated, the washing robot 10 is carried by the extreme part of the crane or hoist arrangement 9, which may be telescopically displaceable and applied as illustrated, and in such a manner that the inclination of the crane arm may be altered and turned around a vertical axis. It is obvious that the crane or the hoist arrangement 9 may be designed in another known manner and with other possibilities for adjustments/alterations of the position of the washing robot 10 at the end of the crane or the hoist arrangement 9.

According to an embodiment of the invention, the washing robot 10 is guided to the tip of the rotor blade 5, which is placed in a position pointing vertically downwards. Once the washing robot 10 has been guided up to an appropriate position, i.e. a position in which the washing robot 10 may grip around the rotor blade 5, the connection to the crane or the hoist arrangement 9 may be released. The washing robot may then move on its own in an automated manner in relation to the rotor blade, as will be explained in detail below. Alternatively, the apparatus may be guided up and/or pulled up by means of lines, wires or the like, according to a preferred embodiment as will also be explained below.

Figure 2:
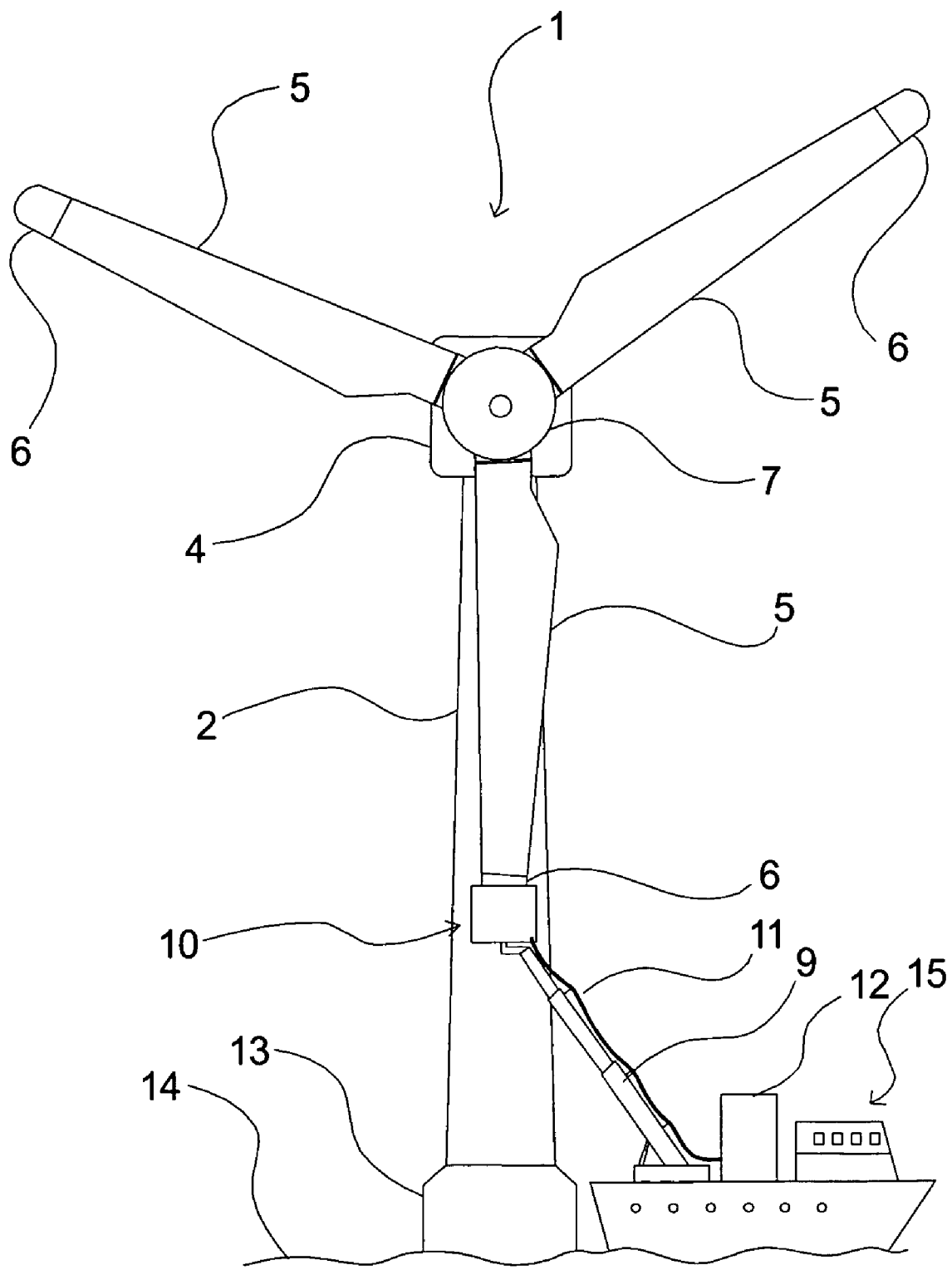
FIG. 2 illustrates utilization of an embodiment of the invention in connection with a wind mill based at sea.

Further, the invention may be utilized in connection with sea (or water-based) windmills as illustrated by FIG. 2. This figure shows a windmill 1 as described above positioned on a windmill foundation 13 in a water-covered area 14. A vessel 15 is provided with a crane or a hoist arrangement 9 corresponding to that described above, said crane or hoist arrangement 9 being capable of lifting a washing robot 10 up to and potentially over the tip of a rotor blade 5. As explained above, the washing robot 10 is connected to wires and/or hoses 11, which lead down to a unit, generally marked 12, via the crane or hoist arrangement and which may e.g. comprise a water tank, tank(s) with cleaning articles, surface treatment means, sealing agents etc. as will be described in detail below.

As explained above, the hoist arrangement 9 may be designed in every imaginable way as long as it is capable of lifting the apparatus up to the required height, and the vessel used does not have to be designed in any particular way. Thus, it may simply be a barge or the like, upon which the hoist arrangement 9 and said unit 12 with supply chamber(s), control equipment etc. may be located. However, it is desirable to have the hoist arrangement feature some kind of control unit so that it would be easy for the user to have the apparatus according to the invention assume the right starting position in relation to the rotor blade.

An apparatus or washing robot 10 will be described in detail with reference to FIG. 3. As illustrated, the apparatus has an encompassing shell or encapsulation 20 which may e.g. be cylindrical or essentially cylindrical. It is understood that when in operation, the washing robot 10 should be able to move up and down a rotor blade with the rotor blade extending through the apparatus 10 in parallel with the longitudinal axis of the apparatus.

The apparatus may feature several treatment zones, e.g. the illustrated zones 21, 22, 23, 24 and 25. In the illustrated embodiment, the zones 21, 23 and 25 have been designed as areas with a number of nozzles 26 or the like, which may spray fluids such as water, cleaning articles, surface treatment means etc. but also means in powdered form, onto the surface of the rotor blade. Furthermore, air, potentially heated air, may be blown thorough the nozzles 26 for drying the surface.

The zones 22 and 24 are designed as brushing zones, in which brushes may be placed, in particular rotating brushes, capable of cleaning the surface. For instance, such a brushing zone may comprise a rotating brush positioned on each side of the apparatus which corresponds to each side of a rotor blade. Such a rotating brush may be designed with a logitudinally extending middle part, upon which a number of long bristles may be located extending radially outwards. Thus, the brush may be positioned with its longitudinal axis across the apparatus 10 so that the bristles will brush the surface of the rotor blade, once the brush is rotated. It is obvious that the apparatus 10 comprises actuators, for instance electric motors, for driving the brushes around, and potentially means for adjusting the distance to the rotor blade, if necessary.

Figure 3:
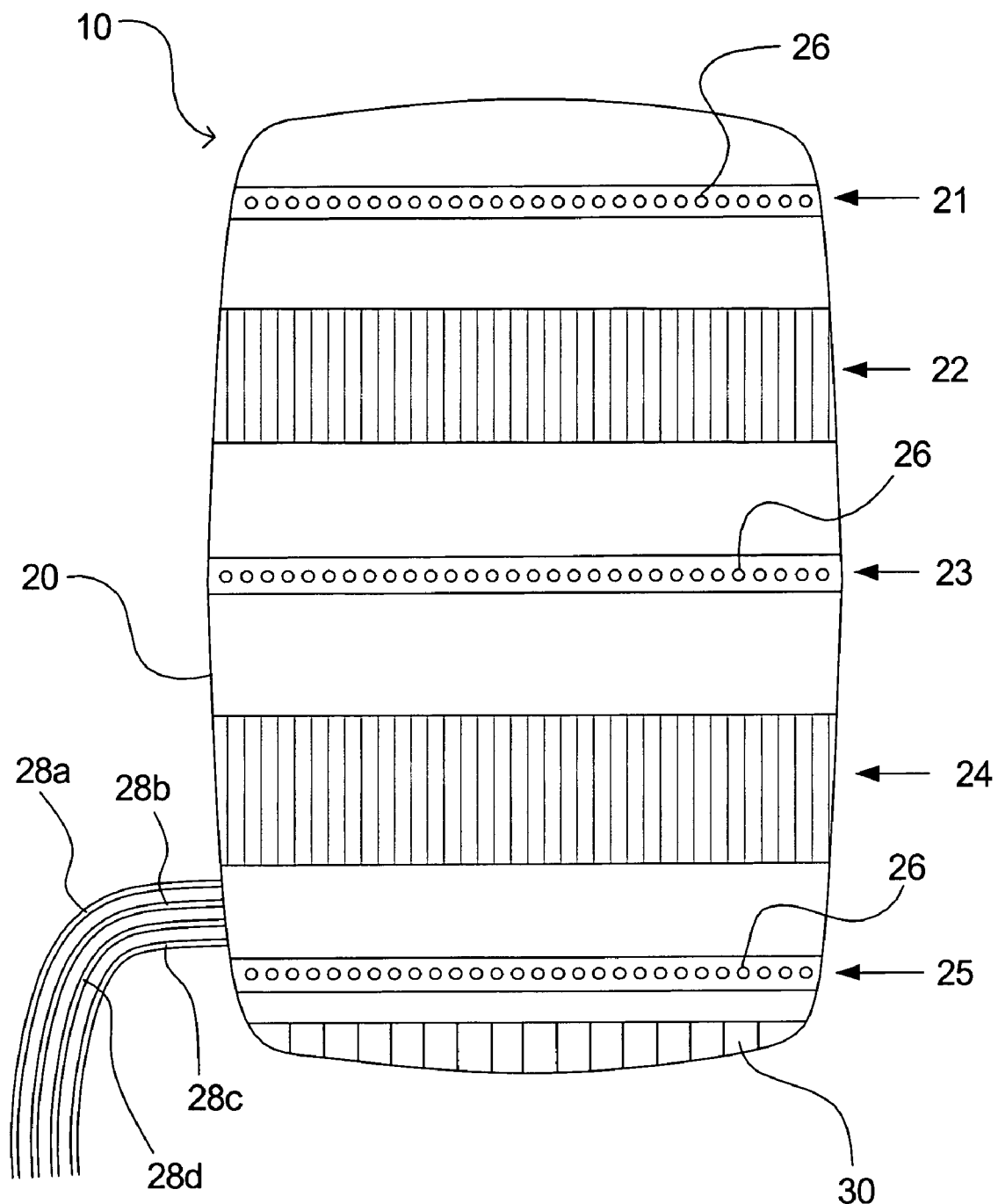
FIG. 3 is a sectional and schematic view of a general embodiment of an apparatus according to the invention.

As illustrated in FIG. 3, sealing means will be positioned at the ends, and in particular at the lower end, for sealing against the rotor blade during operation. The encapsulation 20 may be designed in such a manner that the ends feature inverted edges, however this is limited by the shape of the rotor blade and its dimension variation in the longitudinal direction. In order to ensure that the means utilized for treatment, such as water, cleaning articles, surface treatment means etc., may be collected, and to ensure that the wind does not lead such means away from the rotor blade, sealings may be provided at the ends, for instance at the bottom as illustrated. Such sealings may be in the shape of rubber sealing or other flexible sealing agents 30. Thus, it is also possible to have a sealing divided into tongues, which sealing is illustrated in FIG. 3, so that it is ensured that the sealing will abut closely to the surface of the rotor blade.

Furthermore, FIG. 3 illustrates a number of connecting wires, hoses, cables or the like 28*a*-28*d*, which may e.g. be power supply cables, hydraulic or pneumatic hoses, signal wires for e.g. control equipment, wires for vision equipment, hoses for supplying water, cleaning articles or other means, hoses for discharge of water and other means, e.g. used water discharged with dirt and possibly cleaning articles etc.

Instead of having the hoist arrangement lift the apparatus, e.g. the washing robot, up to the tip of the rotor blade 5, after which the washing robot moves up the rotor blade, it is possible to use a fastening on the windmill, for example in a position at the root of the windmill near the hub, after which a washing robot, a work platform or the like may be moved in relation hereto, e.g. by being pulled by means of wires or the like. This is exemplified in detail in FIGS. 4 to 6 which illustrate various designs of such a fastening.

Figure 4:
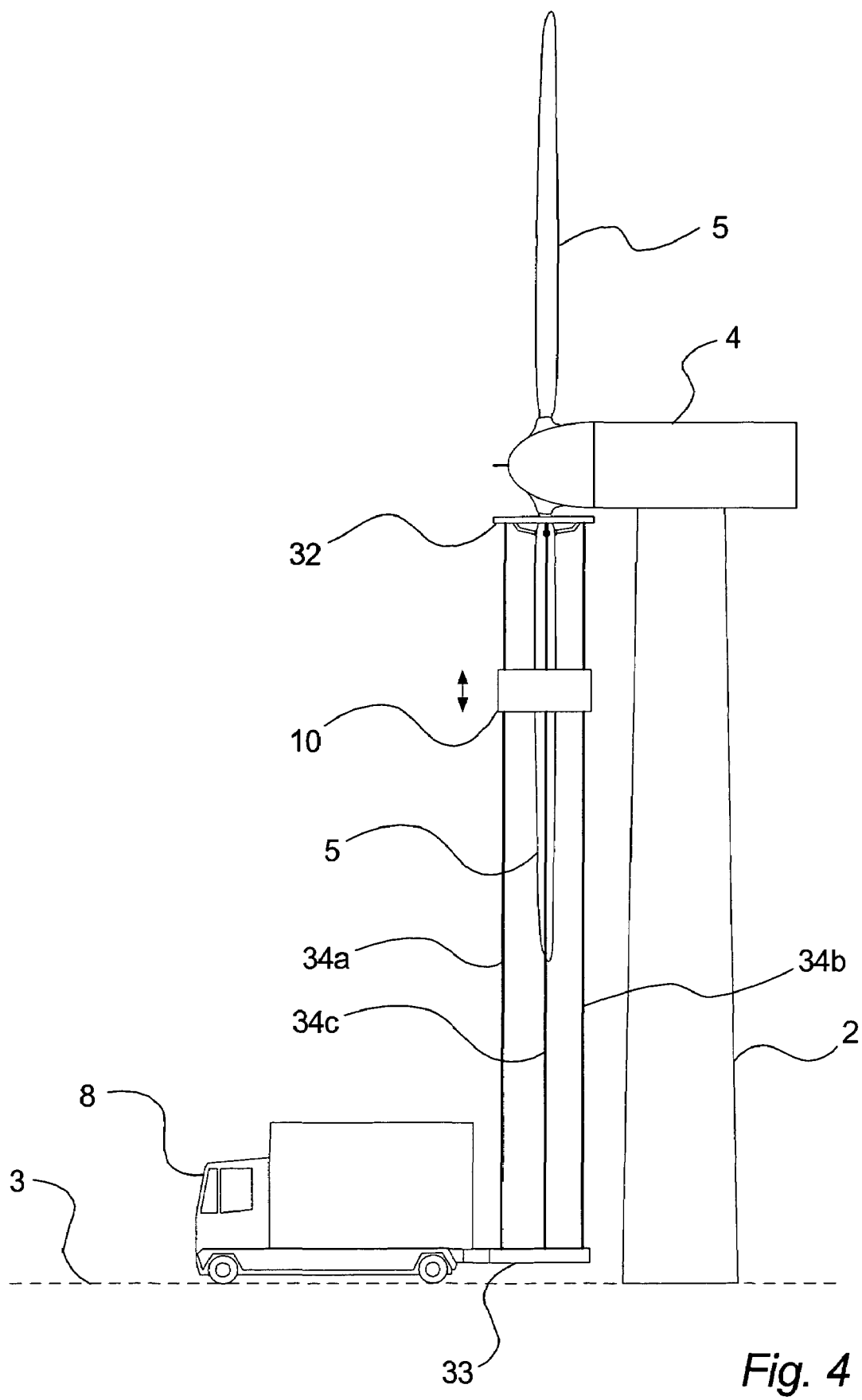
FIG. 4 illustrates utilization of yet another embodiment of the invention in connection with a land-based wind mill, FIGS. 5a & b are side views of embodiments of an apparatus according to the invention during treatment of a rotor blade.

FIG. 4 shows a vehicle 8 provided with an outrigger device 33 used during operation of for instance a washing robot 10 on the rotor blades 5 of a windmill. As illustrated, a fastening 32 has been applied or positioned at the root of the rotor blade parked in vertical position, said fastening being connected to a number of wires or the like 34*a*, 34*b* and 34*c*, and extending down to the vehicle 8 or to the ground 3. The washing robot 10 may be designed in such a manner that it may pull itself up and down these wires 34*a* to 34*c*, or it may alternatively be fixedly mounted to these wires, which may, in turn, be pulled up or down, e.g. by being led over tackles or the like at the fastening 32, so that the wires may be pulled up and down by means of for instance a hoist on the vehicle 8.

The fastening on or at the windmill may be established in a number of ways. For example, it is possible to make this fastening permanent on the windmill, or it may e.g. be fixed to suspension means at each of the two other rotor blades near the hub of the rotor as is described in said German utility model publication DE 296 03 278 U. It is also possible to establish such a fastening by e.g. leading a fastening device up to the hub or another appropriate location on the windmill for positioning, fastening or the like. It will also be possible to have such a fastening device move up and down in a controlled manner, for example by moving it up the rotor blade, and possibly control it by means of the rotor blade and possibly by own power or lift/elevation. Alternatively, it may be pulled up by means of a wire or the like and by a hoist if such a hoist is mounted to the nacelle 4 of the windmill, to the rotor hub or elsewhere, which is the case with certain windmills.

Once it has reached the root of a rotor blade, which is typically smaller in dimension or at least in width, the fastening device 32 may e.g. be fixed by causing it to grip around the rotor blade which may be done by various means as will be apparent to a person skilled in the art. For example, support parts may abut against the surface of the rotor blade as indicated, or a circumferential device constructed by means of for example straps, may be tightened around the rotor blade so that the fastening device 32 will be fixedly mounted to the rotor blade.

Instead of a washing robot or the like, the fastening device 32 may be used to pull a work platform or the like up or down the rotor blade, which method may e.g. be used when the rotor blade needs inspection or repair, manual maintenance etc. Such a work platform may be designed in essentially the same manner as a washing robot, i.e. with a can-shaped encapsulation and with operating, pulling or control means of the same kind as described here. Thus, it is understood that an apparatus 10 according to the invention also includes an apparatus designed for use as a work platform.

However, the fastening device need not be lifted up to the rotor blade 5 by means of a crane or the like, but may be lifted up in another manner by a particularly advantageous embodiment, so that the use of crane devices, hoists etc. may be avoided which will be explained in detail in the following.

Figure 5A:
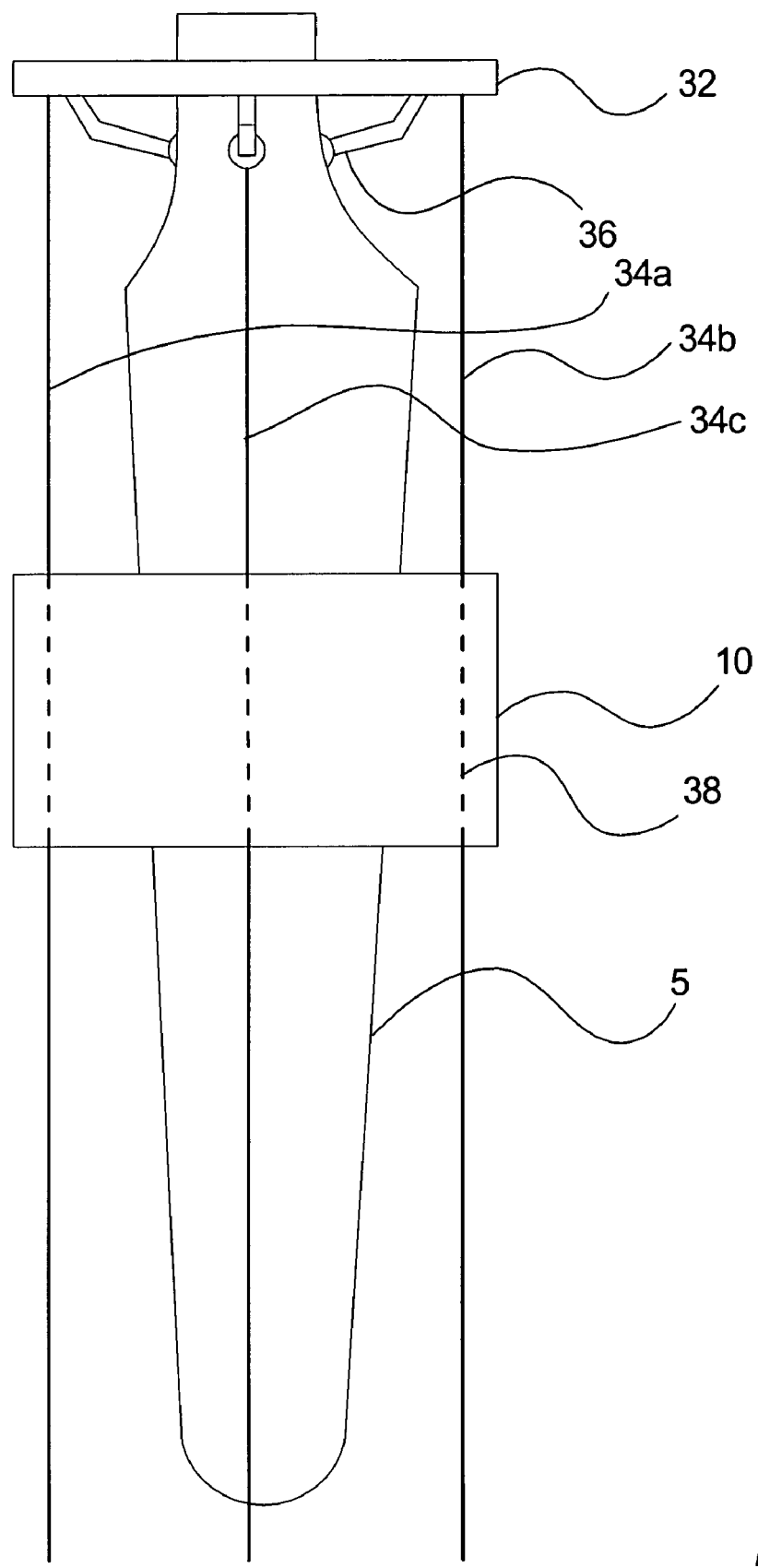

FIG. 5a shows an arrangement corresponding to that of FIG. 4 but on a larger scale. Thus, an example of a fastening device 32 is shown as a schematic example of how the fastening may be carried out, e.g. by support parts 36 gripping around the root of the rotor blade 5 as shown. Furthermore, an apparatus is schematically shown, e.g. a washing robot or a work platform 10, which may be moved up and down the rotor blade 5. As described above, this movement takes place by means of lines, wires or the like 34a, 34b and 34c extending down from the fastening device.

At one of the ends, these lines or the like 34a-c may be connected to the washing robot 10 and may pass over tackles, wheels or the like on the fastening device, so that the washing robot may be raised or lowered from the ground or the root of the windmill, preferably mechanically. A hoist or the like positioned at the fastening device may also be applied.

As specified in FIG. 5a, the lines or the like 34a-c may also be connected to the fastening device 32 so that they extend downwards. In the downwards direction, the lines may be fixed to the ground, to the root of the windmill, for example on or near a means of transportation such as a vehicle or a vessel, or potentially higher up such as under the tip of the rotor blade.

Said lines or the like, of which there may be one, two, three or four or any other appropriate number, may serve to control the movement of the washing robot, e.g. if the washing robot is capable of moving entirely or partly on its own up and/or down the rotor blade. However, it may also, or alternatively, serve as force transferring means, e.g. if force transferring means have been applied in or at the washing robot, so that it may run up and down the lines. Such force transferring means in the washing robot may be pulling devices with for instance one or more wheels, cylinders, coils, rollers or the like, driven by a power source such as an electric motor or by means of hydraulic, pneumatic or corresponding means.

As illustrated in FIG. 5a, the lines 34a-c may be led entirely or partially through the washing robot 10, e.g. as illustrated by 38, where 38 is a guide through a force transferring mechanism or simply a control function. However, the lines may also be led entirely or partially outside of the washing robot, e.g. if the guide organs and/or force transferring means have been placed outside the shell or encapsulation of the washing robot.

Figure 5B:
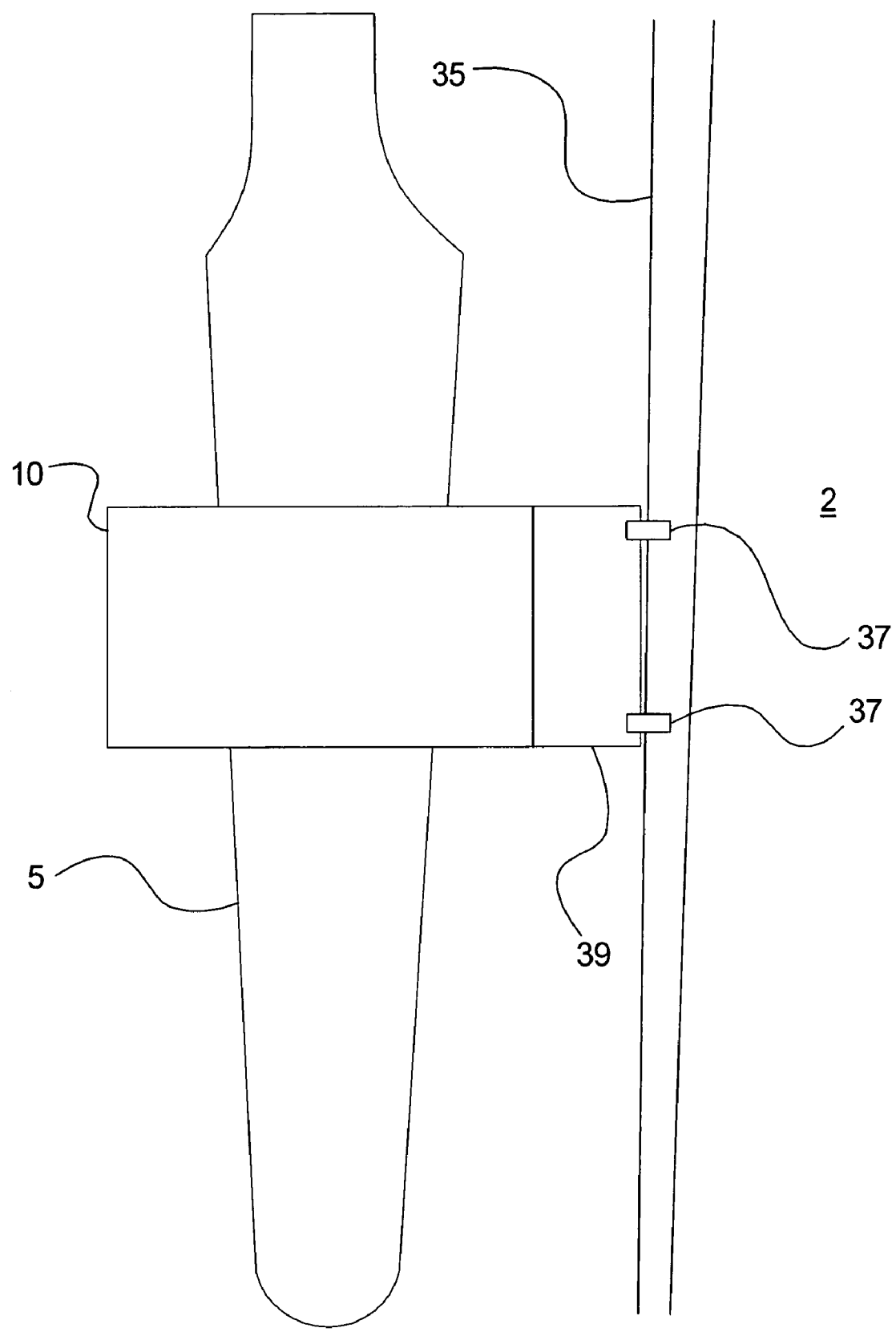

It should be noted that the apparatus may be moved in relation to the rotor blade and moved up to it by means of other means than those mentioned above. Thus, drive means and/or control means may be applied on or next to the windmill tower. This is illustrated in FIG. 5b, in which such a control means is illustrated as e.g. a guide rail 35 positioned essentially vertically of or near the windmill tower 2. Such drive means and/or control means, which may e.g. be designed as control and pull or friction rail 37 as illustrated, may potentially form a permanent part of the windmill tower 2. Thus, the apparatus may be provided with a drive motor or the like, which engages directly or indirectly with for instance a guide rail on the windmill tower. As illustrated, drive means may thus be designed 37 for grabbing onto or around the guide rail 35, and be positioned on a connecting part 39 of the apparatus 10. It is obvious that other kinds of such accessories to the windmill or this design of the windmill tower are possible, so that an apparatus according to the invention may use the windmill tower or a part hereof during upwards or downwards movement.

Figure 6:
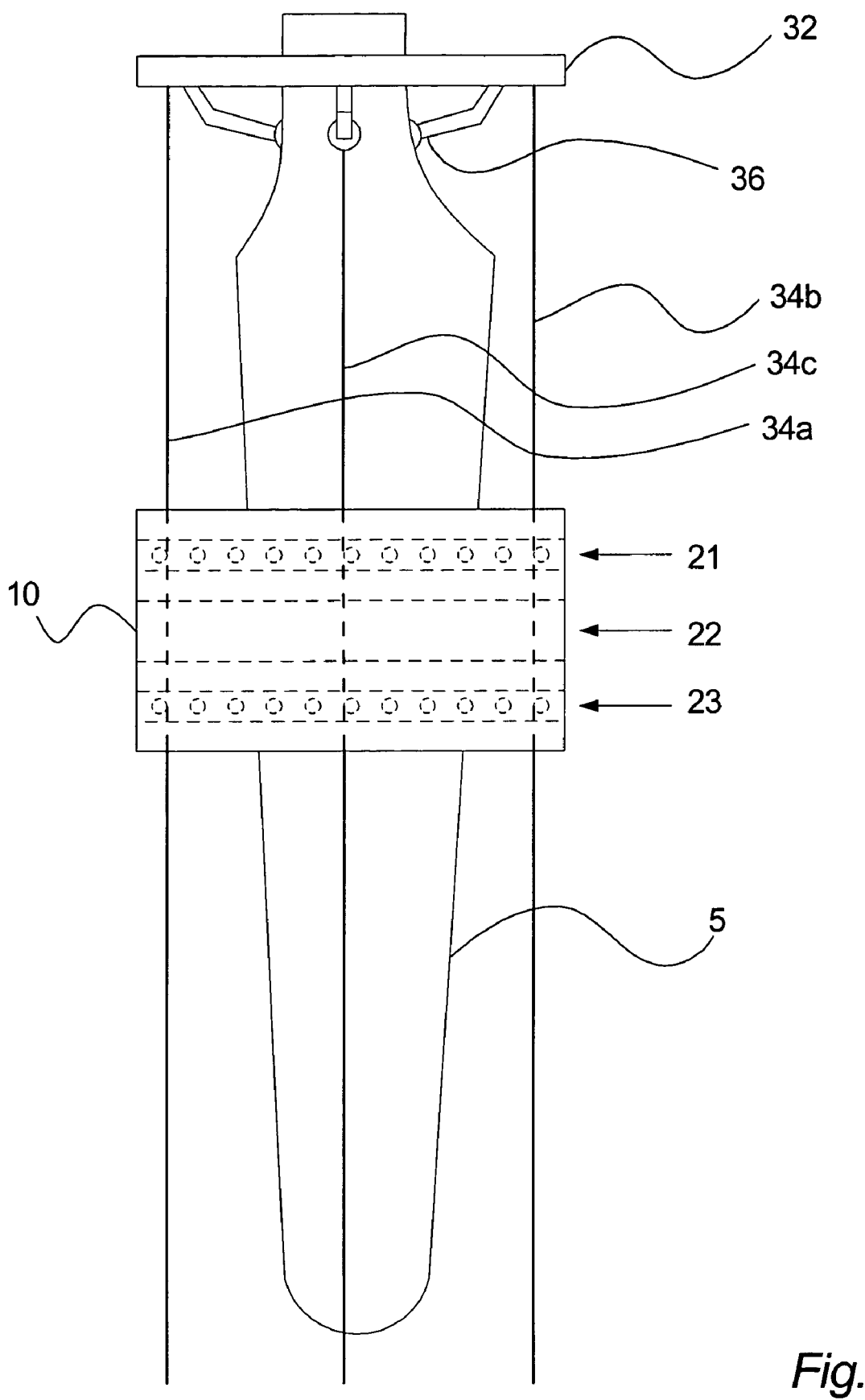
FIG. 6 is a view corresponding to that of FIG. 5a, FIG. 7 shows a cross section of an apparatus according to yet another embodiment of the invention.

FIG. 6 shows an illustration corresponding to that of FIG. 5a, but in which it is also illustrated that the apparatus 10 is a washing robot or the like, which may e.g. have an essentially cylindrical shape with an encapsulation and a number of treatment zones 21, 22, and 23 on top of each other, where 21 and 22 may comprise nozzles or the like for directing jets—or flows of aerosols, drops etc.—of water, fluids, air, cleaning articles and/or treatment means at the surface of the rotor blade. However, it should be noted that solid materials may also be used, so that dust-like materials, particles or the like may be sprayed out. The treatment zones 22 are designed with rotating brushes as described above and as will be described in detail below. It is obvious that a washing robot according to the invention may be designed with brushing zones and/or nozzle zones, just as it is obvious that a sharp distinction between these zones need not be made. Thus, nozzles may be placed in immediate connection with the rotating brushes.

Furthermore, it should be noted that the number of zones and the allocation hereof may vary in numerous ways as will be apparent to a man skilled in this technical area. Thus, one single brushing zone, two, three, or more may be placed in vertical direction, and this may also be the case with respect to the nozzle zones. It is also obvious that any combination of such number of various zones is possible, so that zones comprised solely by one or the other kind are also possible. Furthermore, zones of the same type, for instance brushing zones and nozzle zones, may have different designs, or rather variations, depending on e.g. the location in an apparatus, the purpose etc. Thus, an apparatus with two brushing zones may be designed in such a manner that these two brushing zones are not necessarily identical, but provided with varying brushes, varying brushing types, varying lengths of bristles etc. Correspondingly, nozzle zones—when in excess of one—may have different designs, for instance with varying types of nozzles, a varying number of nozzles with differing mutual distances etc. However, it should be understood that nozzles may also vary mutually within one and the same nozzle zone, for instance in type, mutual location etc.

Figure 7:
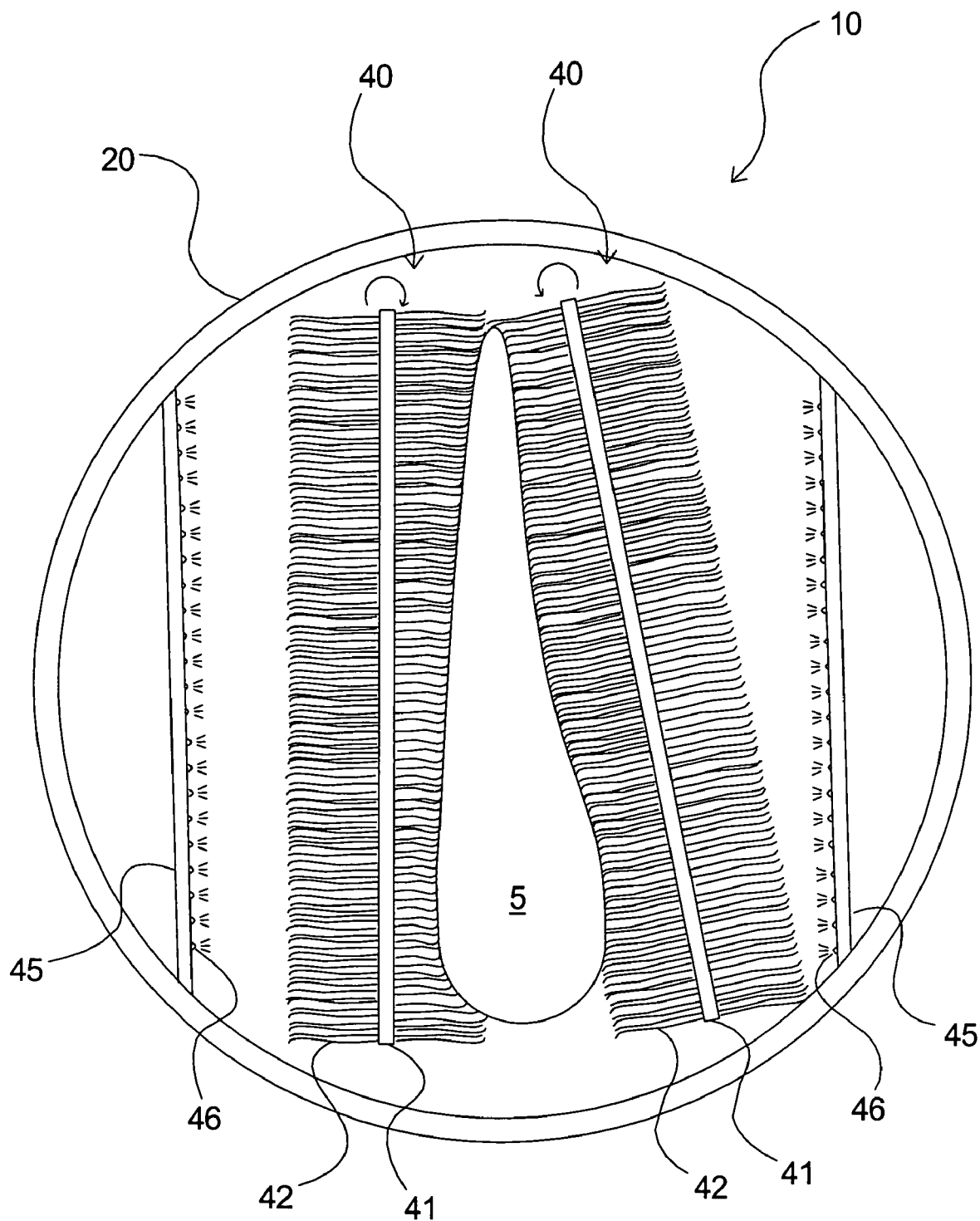

A construction of an apparatus according to the invention, which is designed as a washing robot, will be described in the following with reference to FIG. 7 showing a horizontal section, i.e. a section across the longitudinal axis of the apparatus through such an apparatus, in a situation illustrating treatment of a rotor blade 5.

The section cuts through a brushing zone and it can thus be seen that the brushing zone in this embodiment comprises two brushes 40 with one positioned on each side in the apparatus, so that the two essentially opposite surfaces of the rotor blade 5 may be cleaned by means of these brushes.

These brushes 40 may comprise an axle, a core part or the like 41, upon which a large number of bristles 42 has been positioned radially and in the longitudinal direction of the axle. It should be understood that these rotating brushes 40 may be designed in the same manner as the brushes commonly used in connection with washing halls and washing machines for cars. Thus, it can be seen that during rotation, the bristle strokes the surface of the rotor blade upwards over the entire width of the rotor blade or essentially over the entire width. As the individual bristle is of significant length and flexibility, it is possible to obtain cleaning over the entire width despite the fact that the surface of the rotor blade as illustrated curves in the cross direction, said curves capable of being both convex and concave.

It should be understood that the illustrated rotating brushes have been suspended in non-illustrated means and are also driven by non-illustrated means, for example electrically, hydraulically or pneumatically. It should be understood that the brushes may be fixedly positioned in the apparatus but it should also be understood that they may be positioned in such a manner that they can be moved in relation to the surface of the rotor, for example back and forth, in order to adapt to the thickness of the rotor, but potentially also in such a manner that the angle in relation to the rotor blade is changed, e.g. with respect to the fact that the thickness of the rotor blade at the back edge and front edge may vary over the length of the rotor blade. Such movements may take place under various forms of control as is known from e.g. washing arrangements for cars, and potentially by use of various sensors positioned in the apparatus at different locations.

FIG. 7 also shows that the apparatus may comprise an additional arrangement with nozzles or the like for applying water, fluids, cleaning articles, air, surface treatment means or other. This arrangement is roughly sketched as a number of nozzles 46 or the like positioned on a carrying unit 45 which may e.g. extend over a width corresponding to the maximum width of the rotor blade 5. It is understood that these nozzles or the like may be positioned in other ways, which include the inner surface of the encapsulation 20 of the apparatus. It is also understood that the carrying units 45 may be flexibly placed in the same way as the rotating brushes, so that they may be controlled in relation to the surface of the rotor blade, if appropriate. Furthermore, nozzles may be positioned in special locations in which the rotating brushes have no immediate possibility of carrying out the cleaning in a satisfactory manner, e.g. at the front edge and/or back edge of the rotor blade. It is understood that the shown nozzles will be connected to various hoses, piping etc. for conveyance of for instance water, cleaning articles, air, surface treatment means and the like.

In FIG. 7, the shell of the apparatus is illustrated in a circular form but it is understood that other forms are possible such as oval, square etc., since such forms may potentially improve adaption to the shape of the rotor blade, and since such forms may potentially provide improved and more advantageous utilization of the inside of the shell.

Figure 8:
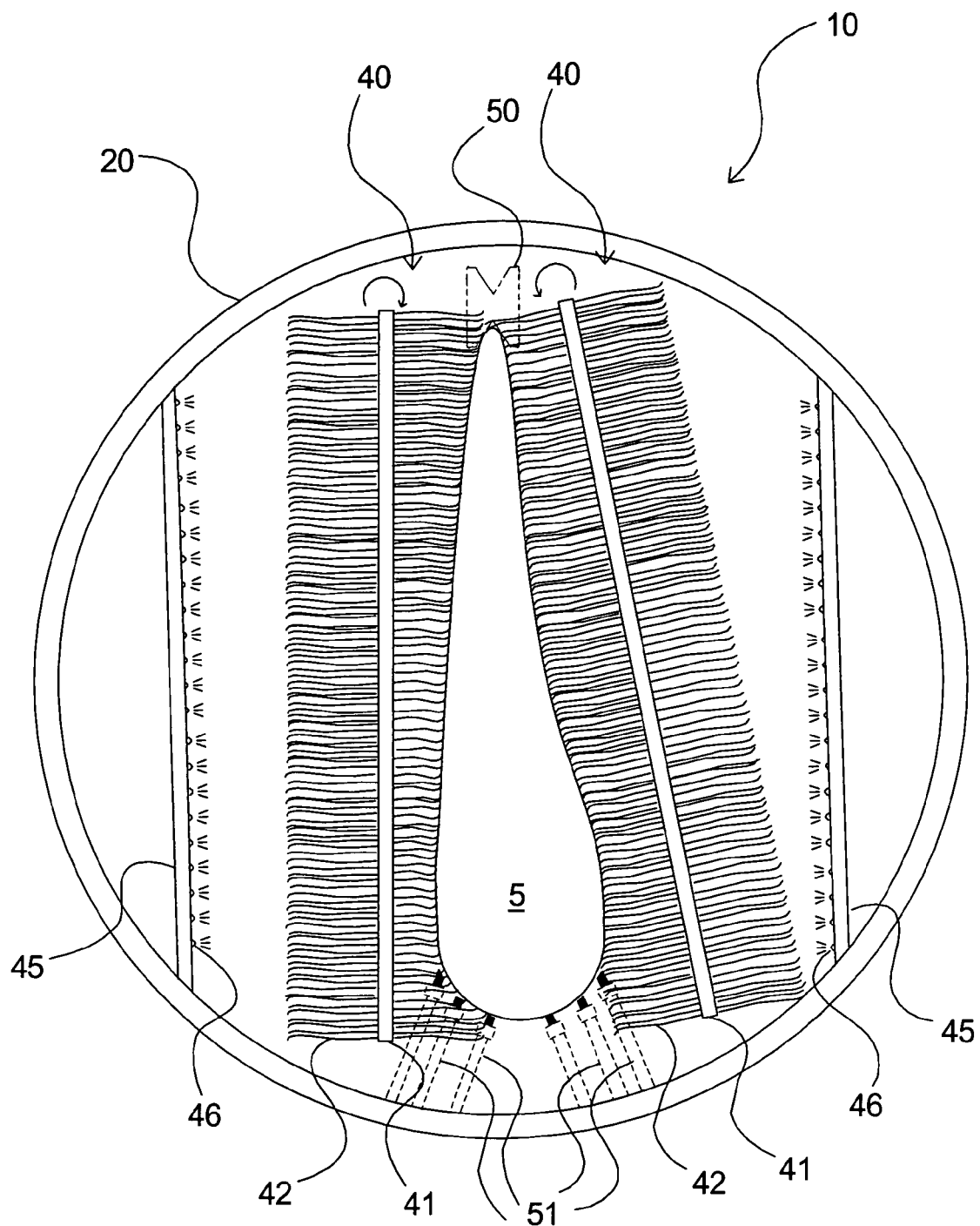
FIG. 8 shows a cross section corresponding to that of FIG. 7, but in which the utilization of control and support means have also been illustrated.

As mentioned above, the apparatus will be moved or move up and down the rotor blade during use, which may take place in various manners as explained above. During this movement, control or positioning in relation to the rotor blade may take place with the purpose, among others, of avoiding damage to both the apparatus and the rotor blade, if for example parts of the apparatus should touch the rotor blade due to e.g. a wind gust, just as control may ensure a higher quality of the completed work. Such control may be established in several ways. For instance, as illustrated in FIG. 8, corresponding to FIG. 7, it is possible to apply a number of control or support wheels 50 and 51, positioned above or below the level of the brushes 40. A control wheel 50, which basically has a V-shaped outer face, may e.g. be used for controlling at the back edge, i.e. the sharp edge of the rotor blade. The support wheels 51 may be applied in other places, e.g. near the front edge as illustrated or abutting the front or back of the rotor blade. It is understood that such support wheels may be positioned in such a manner that they may adapt to the shape and size of the rotor blade which change in the longitudinal direction of the rotor blade. The support wheels may potentially be flexibly suspended, if the issue is one of only minor changes in distance, or they may be suspended in such a manner that the length is adjusted to the relevant distance of the rotor blade. This may be done by having wheels exercise a certain, constant amount of pressure against the rotor blade or otherwise, as will be known by a person skilled in the art.

Figure 9:
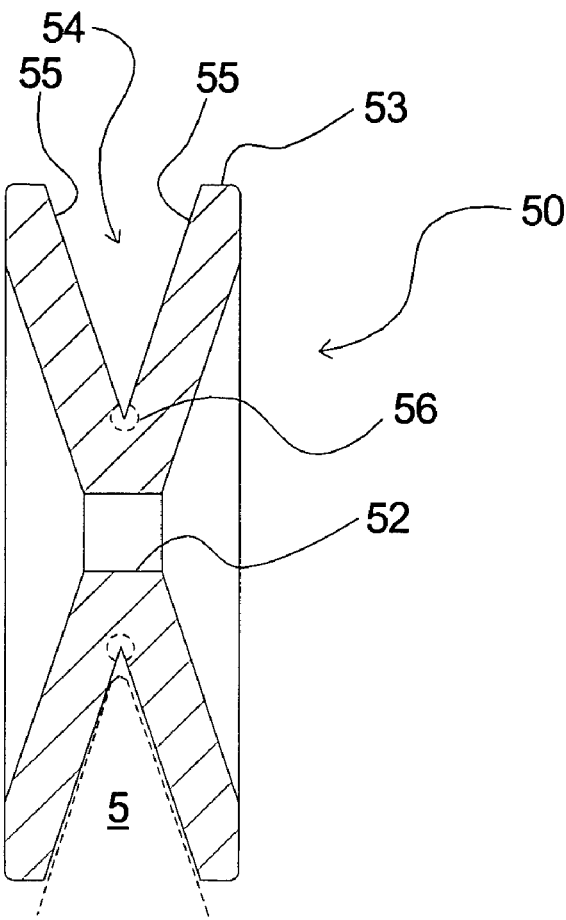
FIG. 9 shows a cross section of an embodiment of a control wheel.

A control wheel 50 will be briefly described with reference to FIG. 9 showing a diametrical cross section of such a wheel. The wheel 50, which may be manufactured of an appropriate plastic material, has a through-going bearing opening 52 for an axle and has a V-shaped circumferential groove 54 with work surfaces 55 in its periphery 53, which conveniently fit the shape of the sharp edge on a rotor blade 5 as indicated by the dash-dot line. If the edge of the rotor blade is very sharp in relation the to the V-shape of the wheel, it may be advantageous to have a bottom notch 56 as sketched.

Figure 10:
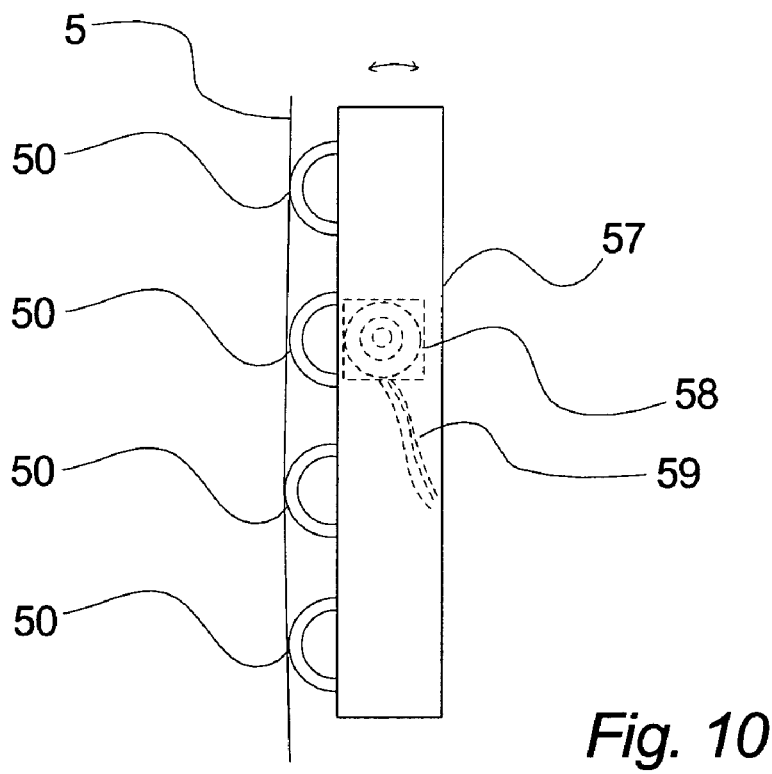
FIG. 10 shows a control unit comprising several of these control wheels.

Several of such control wheels may be positioned on top of each other. This is illustrated in FIG. 10 showing for instance four support wheels 50 provided in a joint bedding 57. It is obvious that there may be less or more than the illustrated four wheels 50. As illustrated, drive means for one or more of these support wheels 50 may be provided, e.g. in the form of an electric motor 58, connected to a power supply and/or control signals via wires 59. One or more of the support wheels 46 may be driving, i.e. connected to the electric motor 58 or they may be connected to an electric motor each. However, the drive possibility will only be of major interest, if the apparatus 10 must be able to move entirely or partly on its own, and of less interest if the apparatus must be pulled up and down by means of lines, wires or the like, extending to the root of the rotor blade. As illustrated by the double arrow, the bedding may be designed in such a manner that it may tip at least slightly, so that it is adaptable to the surface of the rotor blade 5. Alternatively, each support wheel may be flexibly suspended.

As is apparent, an apparatus designed as a washing robot may carry out a number of treatment forms, and these may be combined in any imaginable way. Thus, one form of treatment may effect application of a dissolvent/cleaning agent, while the apparatus moves or is moved up the rotor blade, after which it carries out a washup on the way down. Rotating brushes may be applied during both movements or just during one of them, preferably the latter. Instead, a washup with pressurized water may be carried out when heading up and it may comprise cleaning articles and potentially use brushes, while carrying out some kind of surface treatment with a sealing agents when heading back down. In addition, it is obvious that another round (up and/or down) may be carried out for drying subsequent to the cleaning with water and brushes, e.g. by blowing up compressed air from the vessel or vehicle by means of hoses to the apparatus, by heat radiation from an electric radiation body or similarly known means.

By another advantageous work process, the apparatus according to the invention will initially move up to the rotor blade automatically or by control while spraying a special means onto the rotor blade, said means being capable of dissolving dirt, dead insects, bird droppings etc., as for instance a means containing a protein-dissolving liquid. Once the apparatus has reached the top, it may wait for the applied means to work. The apparatus will then run downwards again while carrying out a high-pressure washing and/or cleaning by using rotating brushes. Once the apparatus has reached the tip again, it may initiate a new climbing towards the top while applying a surface treatment means, such as a sealing agent, for protection of the surface against re-soiling, against damaging rays such as sun light and ultraviolet radiation in general. Once the apparatus reaches the top again, it may begin its descend immediately hereafter or it may potentially carry out other operations during the descend such as inspection of the rotor blade.

It should be noted that other ways and sequences for carrying out said or other work processes are possible, which will be apparent to a man skilled in the art. Also, it should be noted that the apparatus according to the invention may be utilized for work operations such as application of paint, lacquer or other similar means, which may initially have involved pre-treatment such as washup, degreasing etc., just as it may involve finishing such as for instance drying, curing etc. of paint, e.g. by means of hot air, radiation heat created by means of electric energy etc.

It should be noted that the apparatus according to the invention may be provided with other equipment, for instance equipment for control and/or inspection of the rotor blade, to determine the condition of the fibre glass surface etc. Such equipment may furthermore comprise vision equipment which may also serve for guiding for the apparatus, for detecting the degree of surface soil etc.

It should also be noted that the apparatus may be provided with lighting equipment so that utilization of the apparatus according to the invention at all times of day and around the year is made easier. This is particularly advantageous since wind speed may usually not be in excess of, for instance gale, in order for the apparatus to operate in a safe manner. Once these conditions are present, the apparatus must be used effectively and thus also when it is dark. Furthermore, the issue is also one of being able to carry out cleaning etc. while taking into consideration optimal power production of the windmills when the right wind conditions are present, which again favours effective exploitation of these wind conditions for cleaning, sealing etc. and thus also during the evening and at night etc.

In the previous, the invention has been described with reference to specific embodiments illustrated by the figures. Meanwhile, it is apparent that the invention may be varied in several ways within the scope of the accompanying claims.

Thus, it is obvious that apart from or instead of the illustrated nozzles etc. for spraying on water and sealing agents and/or the illustrated rotating brushes, other known means may be used for treatment.

Further, it is obvious that treatment involves environmentally friendly means, i.e. cleaning and sealing agents, which are biologically degradable and in no way harmful. It should be noted that the invention allows controlled application of the means used so that only the required amount per unit area is used. In terms of e.g. the sealing agents, this implies that such means will usually not be applied in such amounts that fluids will run down the rotor blade, even though they are collected by the encapsulation and the sealing against the rotor blade at the bottom of the apparatus as described above, whereby any surplus fluid or other means may be collected and handled in an environmentally friendly manner.

It should be noted that the used nozzles or the like may be used for more or all of the means to be applied, incl. water, just as there may be special nozzles for one or more of the used means. Also, it is obvious that more hoses or the like may lead up to the apparatus 10 or that a hose may be used for leading one or more of the means used.

It should also be noted that by the design of the apparatus, it is ensured that it has as low a weight as possible which is advantageous in terms the apparatus moving easily and safely up and down. Thus, the construction of the apparatus takes place with the most optimal and appropriate materials at the time in question, which ensures the necessary strength and rigidity of the construction while also ensuring that the weight is kept at a minimum.

It should also be noted that various sensors may be used in connection with the apparatus such as distance sensors, detecting wheels, pressure sensors and the like, for e.g. detecting edges, detecting the required pressure by support wheels against the rotor blade, detecting friction etc., and basically for control of the apparatus.

It should also be noted that control equipment, such as for instance electronic equipment, control valves etc. for the apparatus, may be placed on the inside of the encapsulation of the apparatus or on the outside of it. Also, the control equipment may be on or in the vessel or vehicle, and there may be wires for communication between the apparatus and the vehicle or vessel for communication between these units and the control equipment. However, communication may also be wireless, for instance by means of Blue Tooth technology or the like.

As for wireless control, it should also be noted that the apparatus according to the invention may be designed as an independent unit, since it may be provided with its own energy supply, e.g. in the shape of rechargeable batteries, and with chambers for water, cleaning articles, sealing agents etc. sufficient for one work process, for instance treatment of one rotor blade.

Furthermore, it should be noted that necessary installations or components may be placed on or in the vehicle or vessel such as hydraulic installations, pneumatic installations, pumps, electric supply installations,—that may be connected to the power line of the windmill or be in the shape of batteries and/or independent mobile generator installations on the vehicle or vessel—and various control and monitoring installations.

Finally, it should be noted that the apparatus according to the invention may be utilized to carry any imaginable arrangement which may be of relevance with respect to treatment and/or inspection etc. of a rotor blade. The frame construction or encapsulation of the apparatus may thus be perceived as a carrying and transporting part which may transport any kind of equipment to any location on a rotor blade.

The invention claimed is:

1. Method for treatment of a surface of a rotor blade of a windmill, comprising:
    positioning a rotor blade in an immobile position,
    providing an apparatus near said rotor blade, said apparatus comprising means for surface treatment,
    placing the apparatus to be movable in relation to a surface of the rotor blade, and
    moving the apparatus depending on a treatment form determined by the means for treatment mounted on, in or at the apparatus, wherein said surface treatment comprises at least one of:
    cleaning including washing by pressurized water and by using cleaning articles, brushes or sealing agents,
    cleaning including applying mechanical means,
    painting including application of paint or lacquer,
    pre-treatment including pre-treatment cleaning, degreasing or sanding,
    finishing including drying by applying air, heated air or radiation heating, or polishing,
    sealing of the surface by applying wax or corresponding means,
    surface treatment comprising treatment of the surface for anti-soiling or maintenance including application of wax or sealing agents,
    inspection or testing of the surface or parts hereof, inspection or testing of the rotor blade including underlying parts thereof, measurements carried out on or in connection with the rotor blade or the windmill, and treatment of the surface of the rotor blade including preventive treatment or repairs.

2. Method according to claim 1, wherein said moving the apparatus comprises moving essentially in a direction of a longitudinal axis of the rotor blade, the method further comprising the apparatus carrying out a treatment of the rotor blade during at least part of the moving or at a standstill.

3. Method according to claim 1, wherein said moving the apparatus comprising causing the apparatus to move by way of one or more means for exercising a pull including lines or wires positioned near a root of the rotor blade, at a top of a tower of the windmill or at a nacelle of the windmill.

4. Method according to claim 3, further comprising moving the apparatus by controlling a pull in said means for exercising a pull.

5. Method according to claim 3, wherein the apparatus is moved by an apparatus exercising a controlled pull in said means for exercising a pull.

6. Method according to claim 1, wherein said moving the apparatus said apparatus applying force to the rotor blade at least partly in a direction of a longitudinal axis of the rotor blade.

7. Method according to claim 1, wherein said moving the apparatus comprises applying force between the apparatus and a part of a tower of the windmill by means of a guide rail placed on the windmill tower.

8. Apparatus for treatment of a surface of a rotor blade of a windmill, the apparatus comprising: means for transfer of movement in relation to the rotor blade and in such a manner that the apparatus is displaceable in relation to the rotor blade, and means for surface treatment of the rotor blade, wherein said means for surface treatment is configured to facilitate at least one of:

cleaning including washing by pressurized water and by using cleaning articles, brushes or sealing agents, cleaning including applying mechanical means, painting including application of paint or lacquer, pre-treatment including pre-treatment cleaning, degreasing or sanding, finishing including drying by applying air heated air or radiation heating, or polishing, sealing of the surface by applying wax or corresponding means, surface treatment comprising treatment of the surface for anti-soiling or maintenance including application of wax or sealing agents, inspection or testing of the surface or parts hereof, inspection or testing of the rotor blade including underlying parts thereof, measurements carried out on or in connection with the rotor blade or the windmill, and treatment of the surface or the rotor blade including preventive treatment or repairs.

9. Apparatus according to claim 8, wherein said means for transfer of movement in relation to the rotor blade comprises one or more means for exercising a pull including lines or wires positioned near a root the of the rotor blade at a positioning, at a top of the windmill tower or at a nacelle of the windmill.

10. Apparatus according to claim 9, wherein said means for exercising a pull is connected to the apparatus and extends toward said positioning, at which the direction of pull changes.

11. Apparatus according to claim 9, wherein said means for exercising a pull is connected to said positioning, the apparatus further comprising means for exercising a pull in the means.

12. Apparatus according to claim 8, wherein said means for transfer of movement in relation to the rotor blade comprises means for flexibly gripping around two surfaces substantially located across from each other.

13. Apparatus according to claim 8, wherein said means for transfer of movement in relation to the rotor blade comprises drive means for driving the apparatus in the direction of a longitudinal axis, said drive means being incorporated in the apparatus.

14. Apparatus according to claim 8, wherein said means for transfer of movement in relation to the rotor blade comprises drive means and/or control means arranged on or next to a tower of the windmill.

15. Apparatus according to claim 8, wherein said means for treatment of the surface of the rotor blade comprises means for mechanical treatment on the surface including brushes.

16. Apparatus according to claim 8, wherein said means for treatment of the surface comprises nozzles for application of fluids or powdered material.

17. Apparatus according to claim 8, further comprising an encapsulation which is substantially cylindrical in shape.

18. Apparatus according to claim 17, further comprising means for sealing against a rotor blade at a bottom of said encapsulation.

19. Apparatus according to claim 8, further comprising means for inspection of the rotor blade including at least one of optic inspection by means of vision equipment and equipment for carrying out measurements on or control of the rotor blade.

20. Apparatus according to claim 8, further comprising lighting means.

21. Apparatus according to claim 14, wherein said drive means and/or control means comprises a guide rail placed on the windmill tower.

* * * * *